United States Patent
Squire et al.

[11] Patent Number: 6,057,915
[45] Date of Patent: May 2, 2000

[54] PROJECTILE TRACKING SYSTEM

[75] Inventors: Mark Squire, San Diego; Murray Dunn, Encinitas; George Houghton, San Diego, all of Calif.

[73] Assignee: ThermoTrex Corporation, San Diego, Calif.

[21] Appl. No.: 09/136,029

[22] Filed: Aug. 18, 1998

Related U.S. Application Data

[63] Continuation-in-part of application No. 08/667,401, Jun. 21, 1996, Pat. No. 5,796,474.
[51] Int. Cl.$^7$ .............................. G01B 11/26; G02B 26/10
[52] U.S. Cl. ...................... 356/139.05; 359/226; 359/203
[58] Field of Search ........................ 356/139.05, 139.08; 354/226, 198, 203

[56] References Cited

U.S. PATENT DOCUMENTS

| | | | |
|---|---|---|---|
| 3,015,249 | 1/1962 | Taylor | 88/1 |
| 3,204,102 | 8/1965 | Hand, Jr. | 250/83.3 |
| 4,039,246 | 8/1977 | Voigt | 250/236 |
| 4,379,624 | 4/1983 | Miller et al. | 350/486 |
| 4,678,289 | 7/1987 | Mattelin et al. | 350/486 |
| 5,751,460 | 5/1998 | Harrell et al. | 359/198 |

*Primary Examiner*—Mark Hellner
*Attorney, Agent, or Firm*—Fish & Richardson P.C.

[57] ABSTRACT

A projectile tracking system for acquiring and precisely tracking a projectile in flight in order to reveal the source from which the projectile was fired. The source is revealed by the back projection of a 3-dimensional track file. The system is particularly suited for tracking a bullet fired by a sniper and identifying the location of the sniper. Projectiles of interest typically become hot due to aerodynamic heating. A telescope focuses infrared light from a relatively large field of view on to an infrared focal plane array. In a detection mode, the system searches for the infrared signature of the projectile. The telescope's field of view is steered in the azimuth by a step and stare mirror which is driven by an azimuth drive motor mounted on the frame. When a projectile is detected, the system switches to a tracking mode and the mirror is steered by the azimuth drive motor and a pivot motor to track the projectile. A laser radar system provides a laser beam which is optically coaligned with the telescope axis. Mirror angular position information, laser radar pulse travel time, and the missile spot position on detector array are used by a computer to calculate projectile trajectory information and to determine the origin of the projectile using known ballistic trajectory methods. Although only a small portion of the total trajectory may be captured, the very accurate position information permits extrapolation to determine the launch point of the projectile.

8 Claims, 10 Drawing Sheets

PROJECTILE TRACKING SYSTEM

RELATED APPLICATIONS

This application is a continuation-in-part of patent application Ser. No. 08/667,401 filed Jun. 21, 1996, and scheduled to issue as U.S. Pat. No. 5,796,474 on Aug. 18, 1998.

FIELD OF THE INVENTION

This invention relates to systems and devices for locating and tracking projectiles and in particular to such systems and devices for locating and tracking small projectiles such as bullets fired by snipers.

BACKGROUND OF THE INVENTION

Present methods of locating snipers include attempts at locating sniper positions from the acoustic muzzle blast of weapon discharge and by optically detecting the sniper or the muzzle flash. Often these methods do not work in many cases because they can be easily defeated by concealment.

Fast infrared cameras are presently available which can take images of a rifle bullet during its trajectory. These devices form two-dimensional images and multiple sensors widely spaced are required to generate a 3-D track.

Laser radar devices have been known for several years and are regularly used for determining the range and speed of moving objects such as motor vehicles.

Applicants' employer owns a patent on a wide field optical system U.S. Pat. No. 4,883,348 issued to Spivey, et al on Nov. 28, 1989. This system includes a spherical primary mirror and a lightweight secondary optic which can be moved very rapidly in order to scan a field of regard of about 45° to permit the system to track missiles.

A need exists for a better Projectile Tracking System device and method for locating snipers.

SUMMARY OF THE INVENTION

The present invention provides a projectile tracking system for acquiring and precisely tracking a projectile in flight in order to reveal the source from which the projectile was fired. The source is revealed by the back projection of a 3-dimensional track file. The system is particularly suited for tracking a bullet fired by a sniper and identifying the location of the sniper.

Projectiles of interest are typically traveling at a substantial fraction of the speed of sound or even faster than the speed of sound, and therefore become hot due to aerodynamic heating. A telescope focuses infrared light from a relatively large field of view on to an infrared focal plane array. In a projectile detection mode, the system searches for the infrared signature of the fast moving projectile. The telescope's field of view is steered in the azimuth by a step and stare mirror which is driven by an azimuth drive motor mounted on a frame. When a projectile is detected the system switches to a tracking mode and the mirror is steered by the azimuth drive motor and a pivot motor to track the projectile. A short pulse high repetition rate laser in a laser radar system provides a pulsed laser beam which is optically coaligned with the telescope axis. Mirror angular position information, laser radar pulse travel time and the missile spot position on the detector array are used by a computer to calculate bullet trajectory information and to determine the source or origin of the projectile using known ballistic trajectory methods.

Although only a small portion of the total trajectory may be captured, the very accurate position information permits extrapolation to determine the launch point of the projectile.

BRIEF DESCRIPTION OF THE DRAWINGS

Understanding of the present invention will be facilitated by consideration of the following detailed description of the preferred embodiments of the Projectile Tracking System of the present invention taken in conjunction with the accompanying drawings, in which like numerals refer to like parts, and in which.

DETAILED DESCRIPTION

A First Preferred Embodiment

Figure 1:
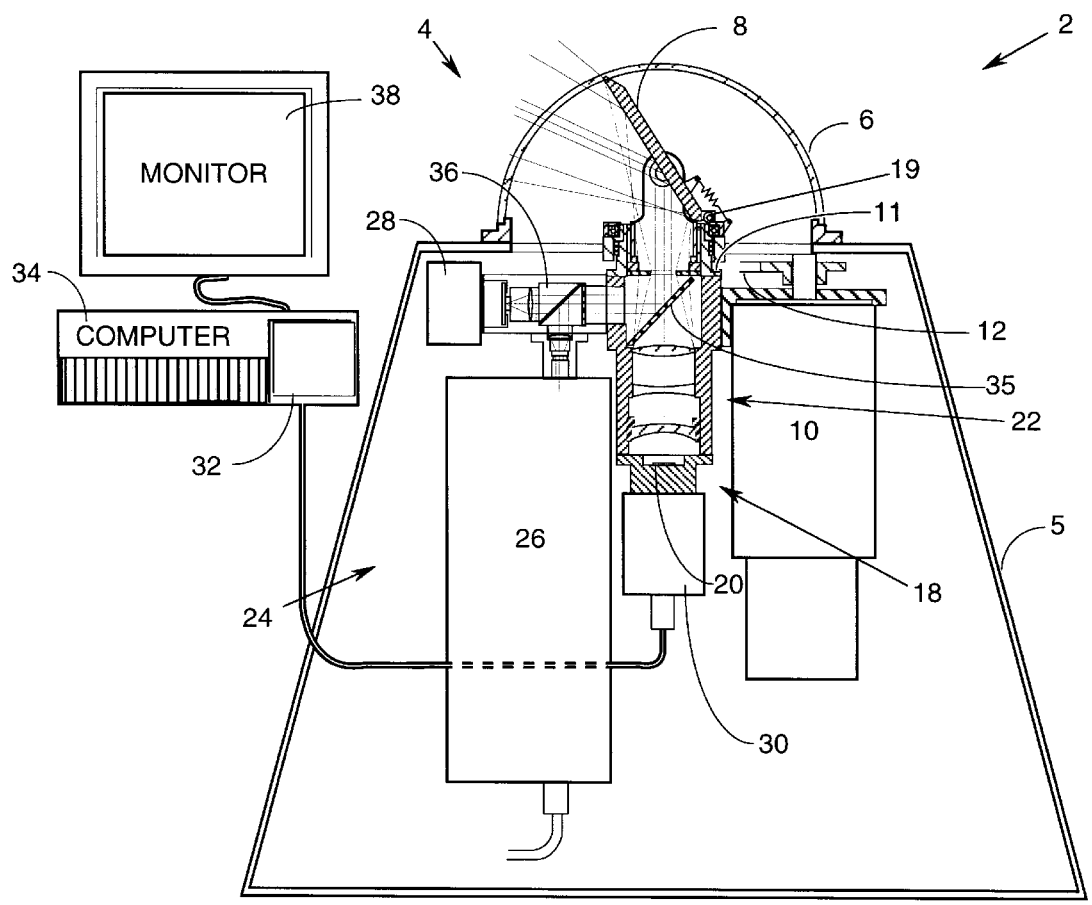
FIG. 1 is a drawing of a preferred embodiment of the Projectile Tracking System of the present invention.

A cross sectional drawing of a preferred embodiment of the present invention is shown in FIG. 1. This embodiment provides a system 2 capable of detecting, tracking and ranging on a sniper bullet in flight. Bullet trajectory information is obtained utilizing an optoelectronic system, coupled to a steerable optical system, for detecting a projectile through the steerable optical system, steering the steerable optical system to track the detected projectile, and generating range and position for the detected projectile. In the preferred embodiment, the optoelectronic system includes a very high speed digital infrared camera and a laser ranging and tracking system. The bullet trajectory information is then used to calculate a back trajectory to identify the firing origin. The origin information is displayed to identify the location of the sniper.

Figure 2:
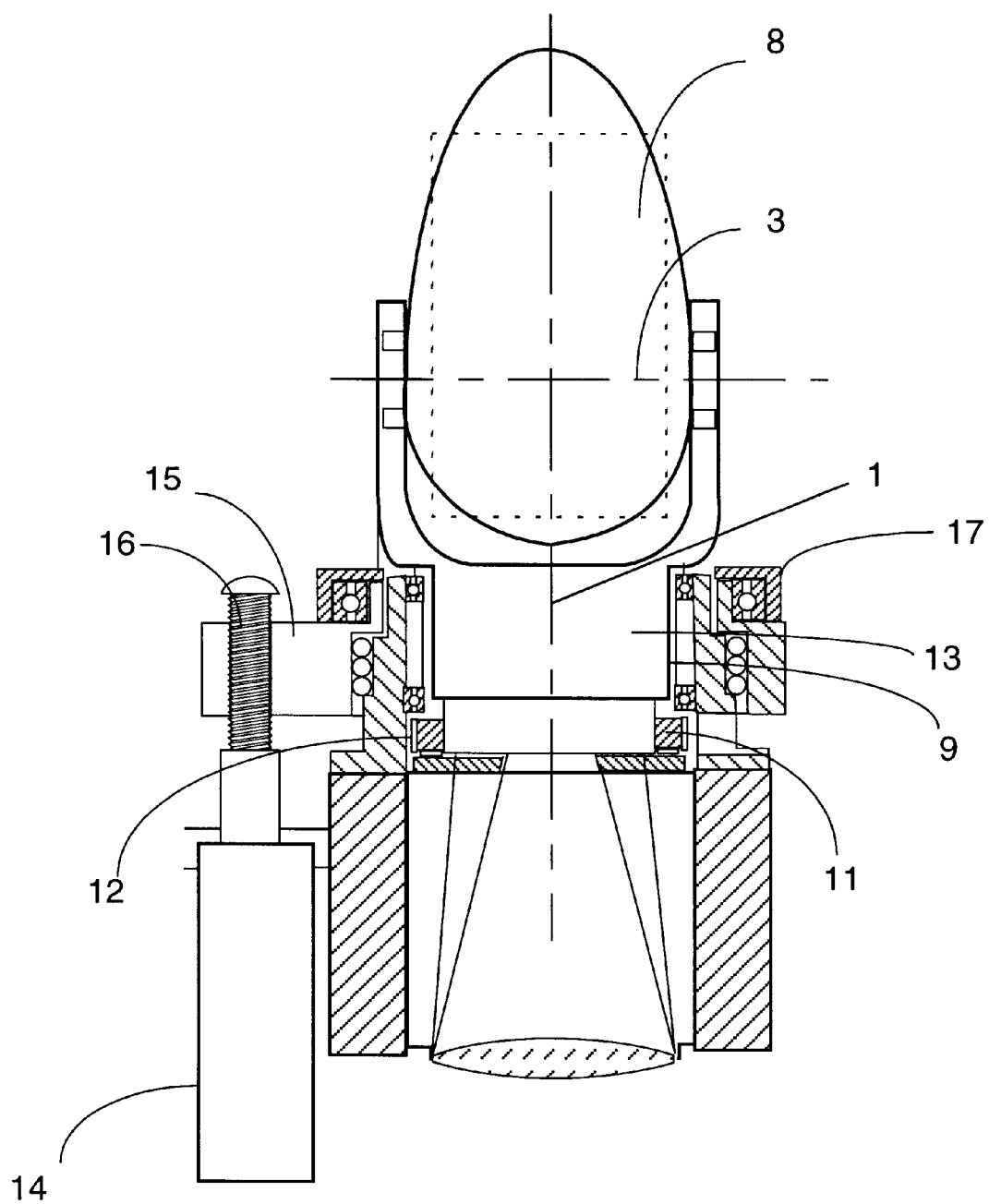
FIG. 2 is a drawing of a view of a position of the Projectile Tracking System shown in FIG. 1.

The system is contained in case 4 which comprises frame 5 and infrared transparent dome 6. In the illustrated embodiment, step and stare mirror 8 is driven azimuthally by azimuth drive motor 10 and tooth belt 12, while mirror 8 is driven in elevation by elevation drive 14 and worm gear 16 as shown in FIG. 2. Light from a particular field of view is reflected from mirror 8 into telescope 18 which focuses the light from the field of view onto an infrared focal plane array 20. Zoom optics 22 in telescope 20 provide a field of view which is adjustable, preferably between about 4° and 20°. A laser ranging and tracking subsystem 24 includes a laser 26 and a laser range detector 28.

The system has two basic modes of operation. In Mode 1 the system looks for bullets. If an incoming bullet is detected, the system switches to Mode 2 during which it tracks and ranges the bullet.

Mode 1—Scanning for Bullets

In Mode 1, a detection mode, a coverage area which, for example, could be 180° azimuthal and 38° elevation, is continuously scanned. This is accomplished by the step-wise guided movement of step and stare mirror 8. In the illustrated embodiment, the Mode 1 field of view of the mirror-telescope system is about 20°×20°. Thus, we can cover the 180°×38° field in 20 step and stare steps, with a 2° overlap in each step.

At the completion of each step, two frames of infrared data are acquired from the focal plane array and are analyzed to detect the presence of a heated bullet. These step and stares occur at an approximate 100 Hz rate, which provides for a full area coverage scan rate of approximately 5 Hz. Therefore, all portions of a 180°×38° field of regard are observed each ⅕ second.

Detection of Incoming Bullet

Bullets tracking through the air typically travel at speeds near the speed of sound and they become hot very quickly, typically in the range of 700–900° K. Telescope 18 images each object field upon mid wave infrared two dimensional focal plane array 20. Array 20 is a commercially available detector array (Model AE186) manufactured by Amber Engineering with offices in Goleta, Calif. It consists of 512×512, 25 $\mu$m pixels which are sensitive to radiation between approximately 3 $\mu$m to 5 $\mu$m in wavelength. Array 20 has a frame rate of approximately 480 Hz. The analog image data generated by the Array 20 is digitized by pixel array control hardware 30 (Model SVS2000) supplied by Lumitron Corporation with offices in Louisville, Ky. This hardware also performs frame to frame pixel subtraction, in the detection mode (Mode 1), and formats the data for output to TMS320C40 digital signal processor boards 32 manufactured by Ariel Corporation having offices in Highland Park, N.J.

Figure 5A:
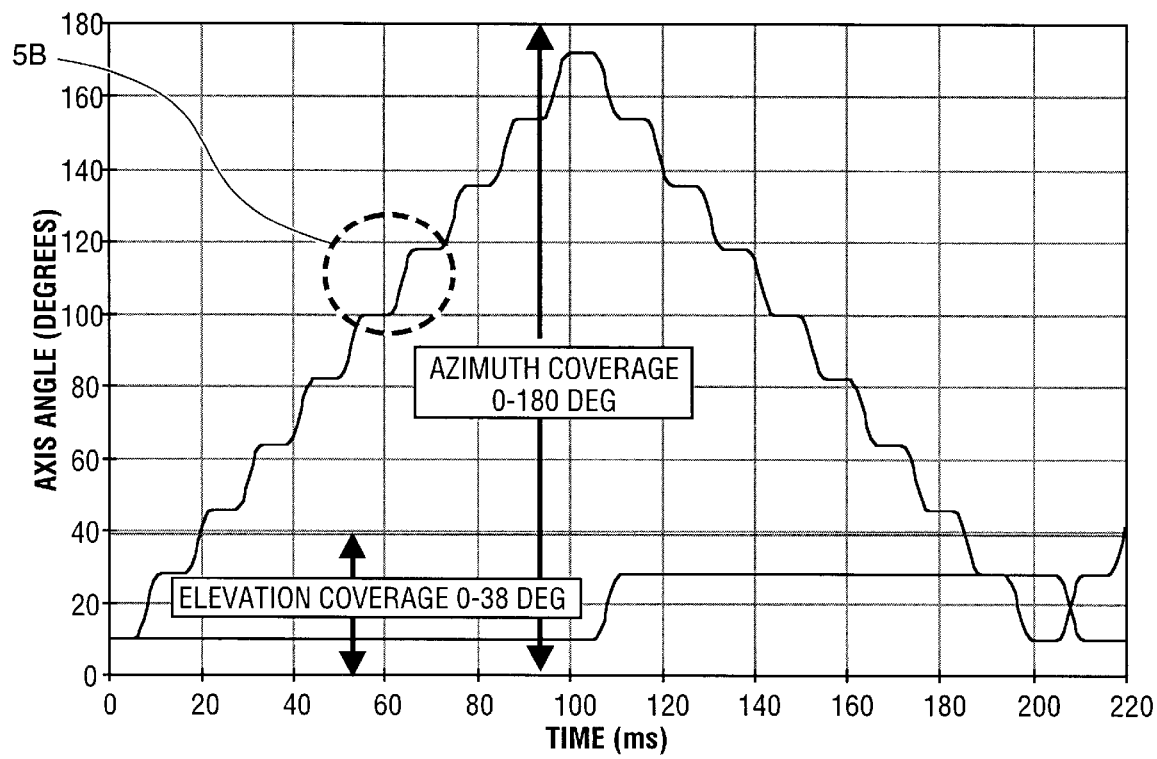
FIG. 5 is a chart demonstrating a preferred step and stare process.
Figure 5B:
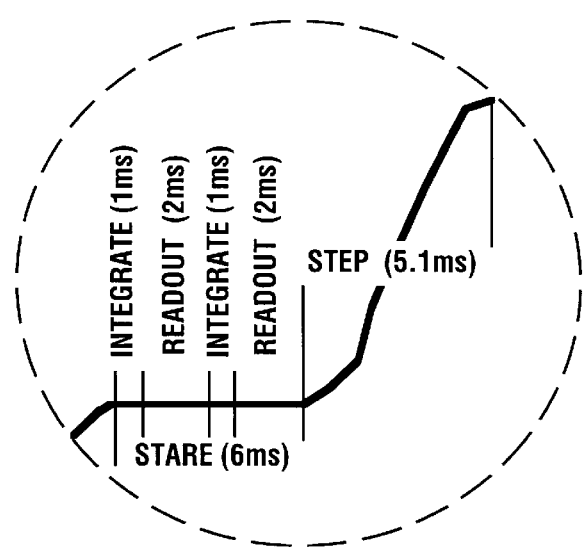

FIG. 5 is a graph showing a typical pointing direction as a function of time and the intervals during which the system is in a "stare" configuration. The frame to frame subtraction makes a hot fast moving bullet relatively easy to detect against the essentially stationary cooler background. The digital signal processor boards 32 calculate the centroid of intensity of the target, if it exists. This centroid data is then passed to a supervisor computer 34 (such as a VXIC850 supplied by National Instruments of Austin, Tex.) which uses this information in Mode 1 to determine if a target has been detected in each step/stare field of view. At night, when background light is small, it may be feasible to eliminate frame to frame subtraction which could speed up the scan rate.

In the detection mode, the mirror can be rotated continuously in one direction or it can be scanned back and forth over a relatively small field or regard (for example, 30°). In this application, the term "rotation" is intended to cover back and forth rotation over small arcs such as about 30°.

When the supervisor computer 34 determines that an incoming bullet has been detected, the system is immediately switched from Mode 1 (detection) to Mode 2 (tracking and ranging).

Mode 2—Tracking and Ranging Bullet

In Mode 2, the variable field of view of telescope 18 is zoomed to about 4° with zoom optics 22. A digital feedback loop calculated from the bullet image centroid in processor 32 controls the operation of mirror drive motors 10 and 14 in order to place and maintain the bullet image in the center of the telescope 4° field of view. When the image is in the center, the laser radar subsystem 24 will begin ranging on the bullet. The laser used in the illustrated embodiment is manufactured by Fibertek Corporation with offices in Herndon, Va. This laser is a pulsed YAG, with a 10 ns pulse width, and up to 250 Hz pulse repetition frequency (PRF). Preferred pulse rates are within the range of 100 Hz to 250 Hz, and preferred pulse widths are between 5 and 20 ns. The YAG output wavelength is 1.06 nm which is shifted to 1.55 nm (an eye-safe wavelength) by passing the beam through an optical parametric oscillator (OPO), also manufactured by Fibertek Corporation. A portion of the outgoing pulse is detected by detector 28 (also supplied by Fibertek Corporation) but substantially all of the pulse is reflected off mirrors 36, 35 and 8 and directed by mirror 8 toward the tracked bullet. A small portion of the laser energy is then reflected from the bullet back to the telescope and is detected by detector 28.

A typical bullet is within the field of regard of the system for about one half second. During tracking, the system collects a set of the following data, typically each 2–10 milliseconds: clock time, laser pulse out time, laser pulse in time, mirror azimuth, mirror elevation, target pixel X position, target pixel Y position. (Mirror elevation and azimuth determine the bullet direction only when the bullet image is at the center of the array 20. The target's X and Y pixel position permits a correction for any deviation of the image from the center pixel.) This provides up to about 500 (but typically 250) sets of bullet positional data per second for each tracked bullet. During the tracking mode, supervisor computer 34 calculates the trajectory of the bullet from the position data and calculates from the data coordinates origins of the bullet. These results may be displayed on monitor 38 in almost real time (i.e., within about one second). The longer the bullet is tracked, the higher the accuracy of the origin prediction.

Ultra Low Inertia Step and Stare Mirror System

A key element of this invention is an ultra low inertia step and stare mirror system. In the preferred embodiment, the mirror is essentially egg shaped or ellipsoidal, approximately 7 cm×14 cm, preferably made of beryllium, and weighs several grams. In the illustrated embodiment, a mirror was used that is manufactured by Optical Corporation of America. This mirror is a compromise between small size, and therefore low inertia, and light gathering capabilities. This size will collect enough photons and provide high enough resolution to detect and track a typical bullet at approximately 1 km. Mirror angular position is controlled on both elevation and azimuth to better than 10 $\mu$Rad accuracy. Angular accelerations of this driven mirror are as high as 40,000 Rad/s$^2$. These accelerations are achievable through the extreme low moving inertia of the mirror, and through the use of three phase, brushless, high torque to inertia ratio motors. In the preferred embodiment, the azimuth motor 10 is a 0.1 HP Electrocraft Brushless Servo motor Model No. E-3629, supplied by Reliance Motion Control with offices in Eden Prairie, Minn. and the elevation motor is a 0.017 HP brushless DC servomotor with a 3:1 gearbox supplied by MicroMo Corporation with offices in St. Petersburg, Fla. In the preferred embodiment, the motor is coupled to a 0.25 diameter drive screw with 10 threads per inch. The pointing accuracy is achieved through the use of a high gain feedback control system using high resolution, high bandwidth, optical angular encoders, such as Model M1 manufactured by Canon Inc. with offices in New York, N.Y.

Mirror 8 may be rotated azimuthally 360° by azimuthal drive motor 10 acting through toothed belt drive 12 on pulley 11 which is firmly attached to frame 9, which in turn is firmly attached to mirror axle support 13, as shown in FIG. 2. In the illustrated embodiment, mirror 8 may be pivoted approximately ±10° by vertical drive motor 14 acting through lead screw 16, which raises and lowers lift ring 17, which in turn raises and lowers the lower edge of mirror 8 acting through roller 19 which travels in a radial track in lift ring 17. This causes mirror 8 to pivot up to approximately ±10° about the horizontal axis of mirror 8. Thus, part 16 rotates about its axis. Part 15 moves vertically; parts 11 and 13 move azimuthally only, part 17 moves azimuthally and vertically and part 19 moves azimuthally, vertically and radially. Thus, the step and stare mirror 8 moves azimuthally about axis 1 and pivots approximately ±10° about axis 3.

This seemingly complicated arrangement permits two axis operation of mirror 8 without one of the drives having to deal with the inertia of the other drive unit. Both motor drives are mounted on the stationary portion of system and are independent of the moving axes. Thus, the total weight which has to be rotated azimuthally is reduced to about 0.6 pounds and the total weight which has to be moved vertically is about 0.4 pounds for this preferred embodiment. These weights are based on use of a beryllium mirror. Aluminum and glass mirrors are inexpensive but significantly heavier.

A Second Preferred Embodiment

Figure 3:
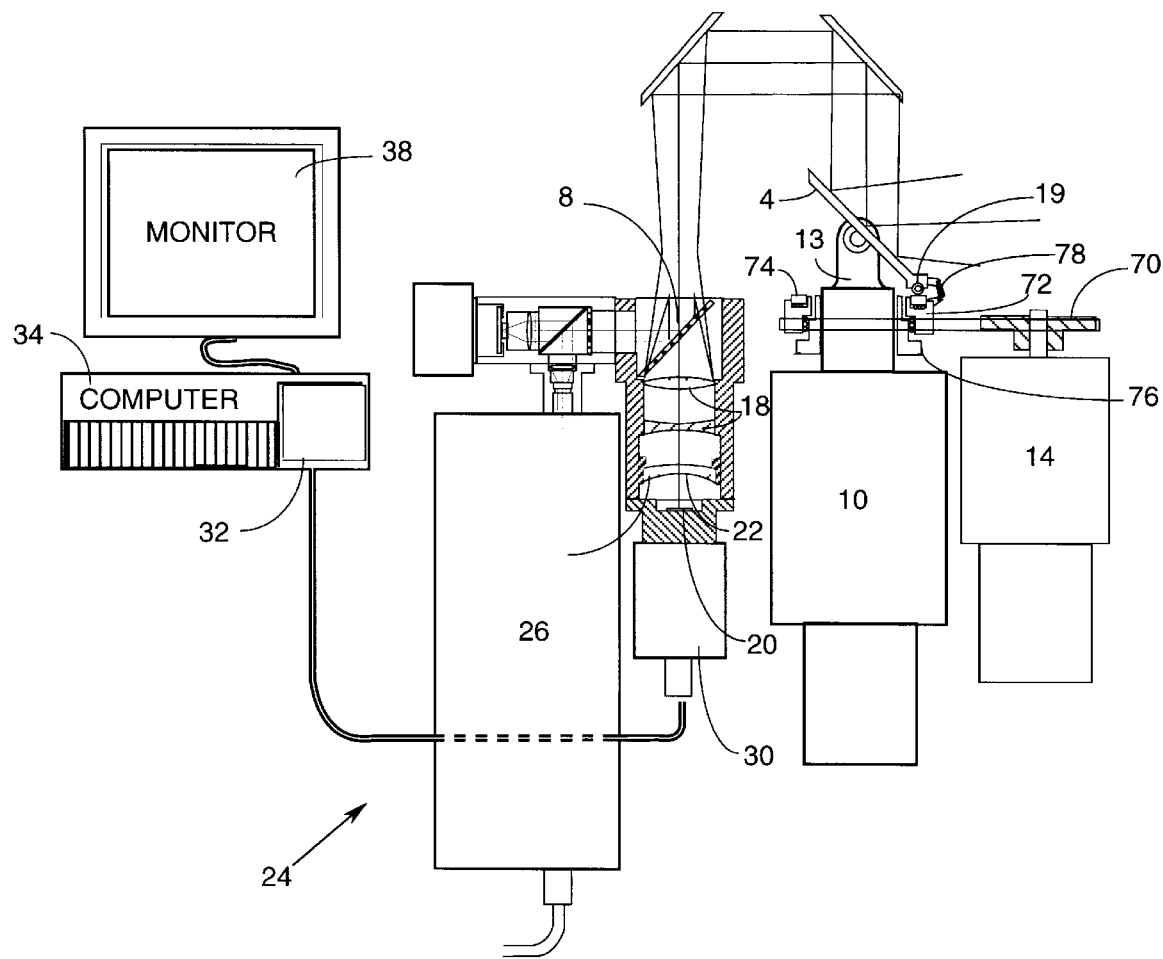
FIG. 3 is a drawing of an alternative embodiment of the Projectile Tracking System of the present invention.
Figure 4:
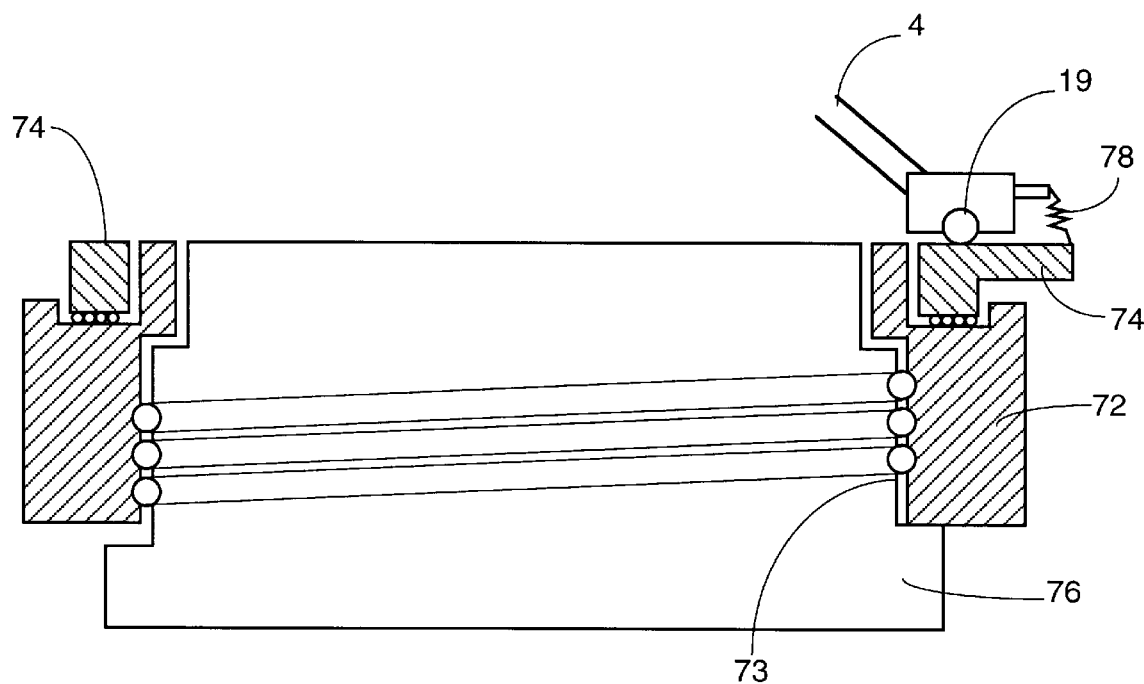
FIG. 4 is a drawing of a portion of the Projectile Tracking System shown in FIG. 3.

A sketch of a second preferred embodiment of the present invention is shown in FIG. 3. In this case mirror support 13 is firmly attached to the drive shaft of azimuth motor 10. Vertical pivoting is provided by elevation drive motor 14 acting through pulley 70 on lift ring 72 which supports rotating track ring 74. A threaded roller bearing 73 acting between lift ring 72 and stationary support ring 76 causes lift ring 72 to rise and lower when the shaft of elevation drive 14 is rotated by drive belt 70. Roller bearings along the bottom of rotating track ring 74 permit rotating track ring 74 to rotate with mirror support 13. Thus, support 13 rotates in azimuth; stationary support ring 76 is stationary; left ring 72 rotates in azimuth as driven by elevation driver 14 and moves in elevation; and rotating track ring 74 moves in elevation with lift ring 72 but rotates in azimuth as driven by azimuth drive motor 10 as it is dragged around by roller 19 which runs in a radial track in rotating track ring 74. Spring 78 holds roller 19 in the radial track on rotating track ring 74. A blowup showing these features is shown in FIG. 4.

Under normal circumstances, origin of the projectile can be determined by following the ballistic back projection until it intersects a stationary object, e.g., the window of a building. However, the origin may not always be from a stationary object, but may originate from an ambiguous set of locations, e.g., one of several trees or hills along the ballistic path. Correlation between device measured ballistic trajectory and known ballistic coefficients can be used to eliminate or reduce these ambiguities. Ballistic coefficients/ conditions for the majority of standard rifle/cartridge combinations have been characterized for some time by cartridge manufacturers, and by the military. Initial (muzzle) conditions are part of the known cartridge/rifle characterizations. Using the correlation between the bullet under track and the known coefficients, type of cartridge/rifle used can be identified. Then, using the known initial conditions for the identified cartridge/rifle and the ballistic back projection calculated for the bullet under track, the origin of the bullet can be calculated to a high degree of accuracy.

In the described preferred embodiments, during Mode 1 (step and stare detection) two frames of data are acquired and differenced during each stare. This function is to maximize signal to clutter ratio, and to be used as a moving target indicator (MTI). In scenarios where the background clutter temperatures are low, only one frame per stare is necessary. This effectively decreases the time between steps, and improves the area coverage rates.

The laser radar described uses a pulsed solid state laser, and a direct detection method from which radial range data is derived. Alternatively, a heterodyne detection system could be incorporated which will allow derivation of both radial range and radial velocity data. Also a pulsed gas laser, e.g., $CO_2$ may be used.

The coverage area described above as 180° by 38° or 360°×20° is arbitrary, and can be expanded to 360° by >90°, at the cost of step/stare coverage rate. Information of calculated projectile origin can be presented to user through a computer display with angle/angle range from device, and/ or with a point or "x" on computer generated situation map, and/or with GPS world coordinates. Alternatively, a beam of light from a spotlight or laser (e.g., HeNe) can be slewed by the device to point out the origin of projectile. Also, the device could transmit GPS correlated origin data via RF or light communications to personnel, who can identify the origin location using GPS equipment. Alternatively, the personnel can use a GPS equipped pointing system which will receive the GPS correlated data from device, and point the user to the origin position using electronic crosshairs and/or other direction indicators. It should be appreciated that information of the calculated origin of a projectile may be presented by other means known in the art, and such alternatives are contemplated herein.

In the case where device is used to detect and track incoming weapons, e.g., a mortar or artillery round, the device can be used to control an autonomous response, e.g., launch and steer an intercept vehicle, or steer and fire a high power laser beam, in order to destroy the weapon prior to impact with its target.

Detector arrays sensitive at wavelengths other than 3 to 5 $\mu m$ may be used, e.g., 8 to 11 $\mu m$ infrared, and/or visible. In addition, multiple arrays, with different sensitive wavelengths may be imaged coaxially through the optical system, and the data from said arrays can be fused to improve data validity.

A Third Preferred Embodiment

Figure 6:
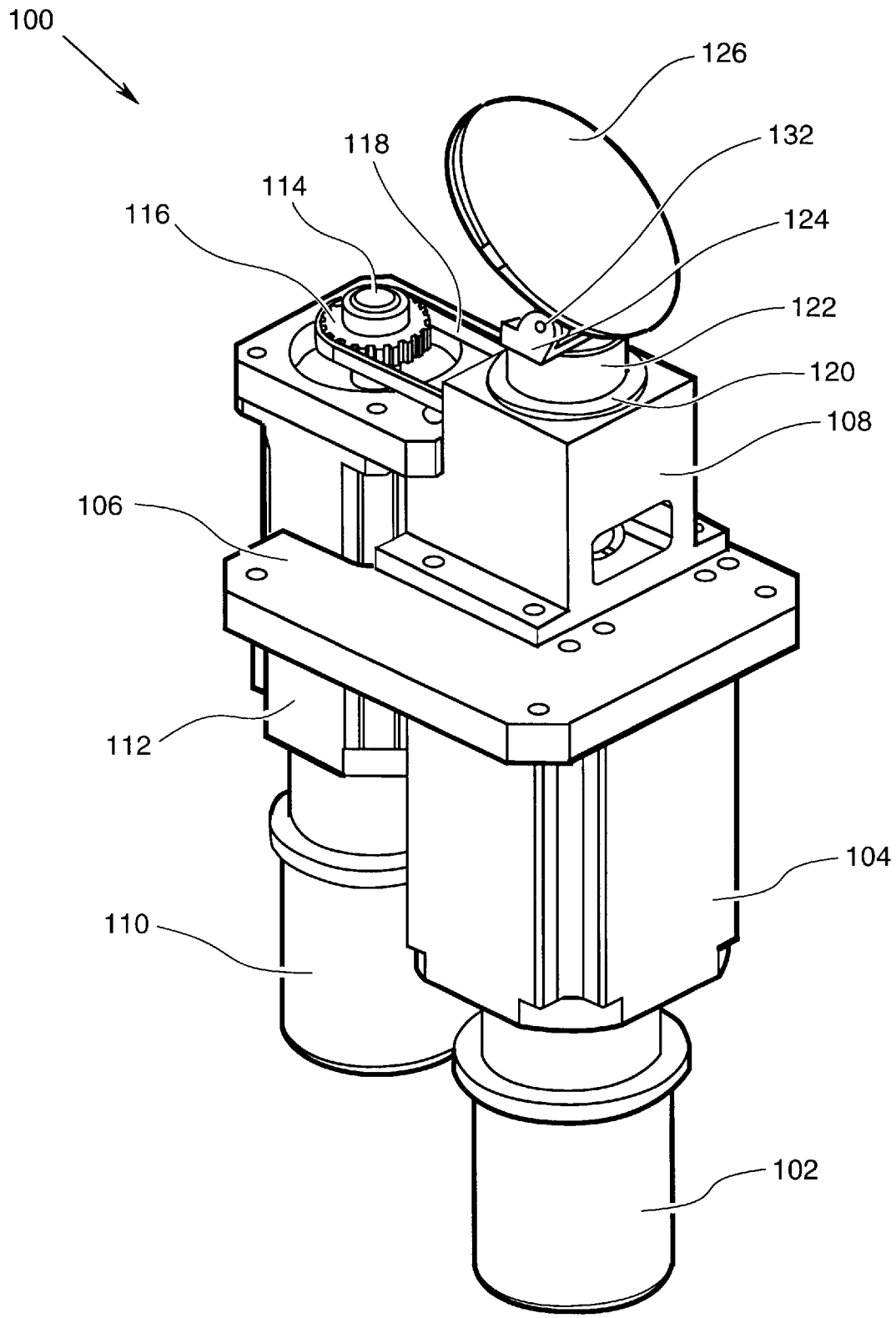
FIG. 6 is a perspective view of an alternative embodiment of the Projectile Tracking System of the present invention showing a stare mirror mounted axially above the azimuth drive motor, with the elevation of the stare mirror controlled by an elevation drive motor rotating an elevation cam.

Referring now to FIG. 6, yet another alternative embodiment of the Projectile Tracking System of the present invention is shown and generally designated 100. Projectile Tracking System 100 includes an azimuth drive motor 102 having a rotational element 103 (such as a motor shaft, shown in FIG. 7) that extends through housing 104 and base plate 106, and into bracket 108. Elevation drive motor 110 has a rotational element 114 (such as a motor shaft) which passes through housing 112 and base plate 106, and is equipped with an elevation drive gear 116. As will be discussed in greater detail below, rotation of elevation drive gear 116 causes belt 118 to rotate elevation cam gear 136 (shown in FIG. 7), which in turn rotates elevation cam 122 above cam plate 120. Rotation of elevation cam gear 136 and the corresponding rotation of elevation cam 122 causes step and stare mirror 126 ("stare mirror", for short) to pivot about bracket pin 132 of mirror bracket 124, thereby changing the elevation angle 131 of the mirror 126.

Figure 7:
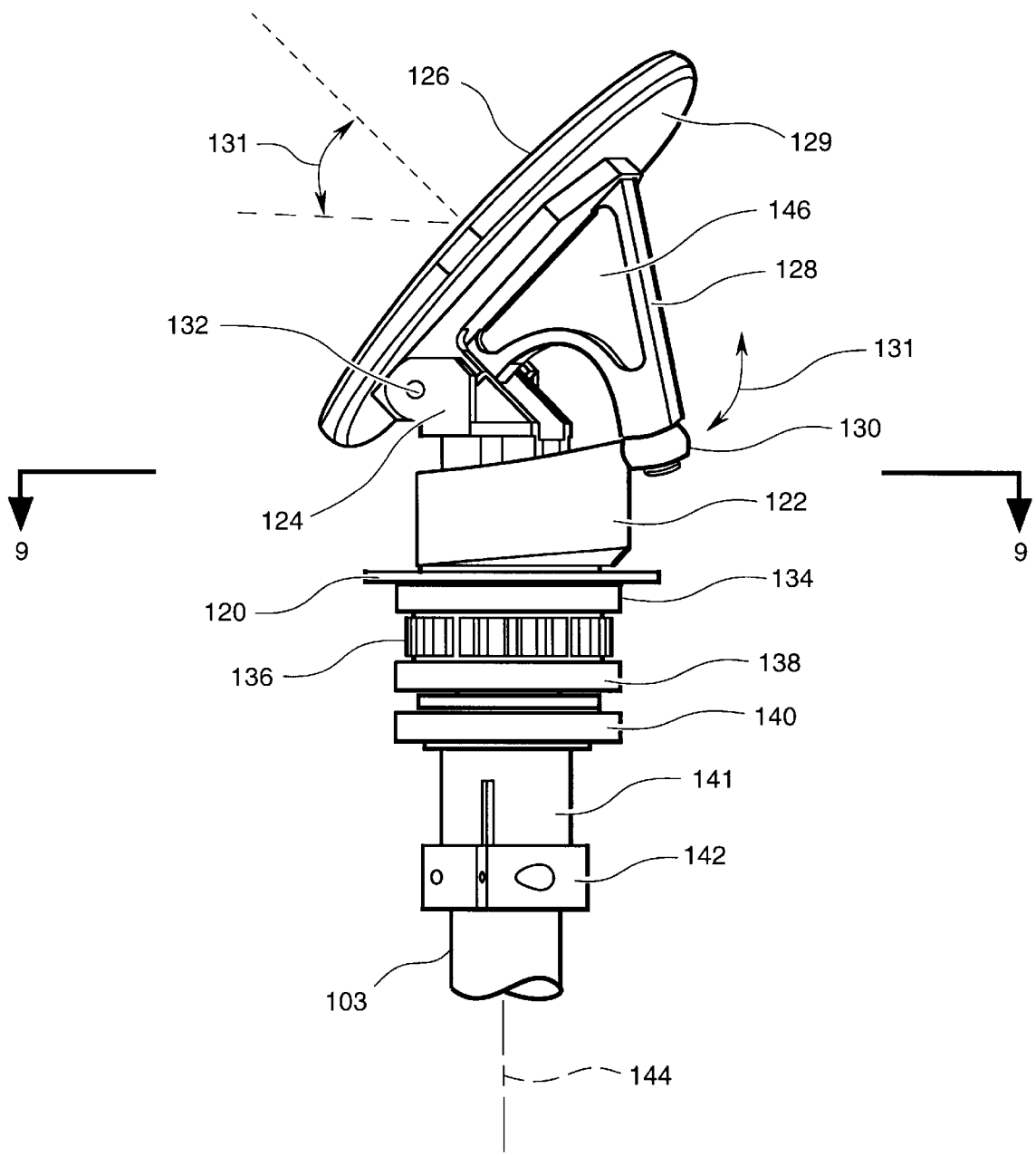
FIG. 7 is a perspective view of the alternative embodiment of the Projectile Tracking System of the present invention shown in FIG. 6, detailing the elevation cam and the cam follower extending from the stare mirror.

FIG. 7 shows the azimuth drive rotational element 103 extending into a coupler 142 which transfers the rotation of the rotational element 103 along axis 144 to shaft 141. Mirror bracket 124 is attached to the end of shaft 141 such that rotation of the rotational element 103 causes mirror bracket 124 and stare mirror 126 to rotate. In order to ensure the stability of shaft 141 during often very high speed rotation, a bearing 140 is positioned along shaft 141. Additional bearings may be incorporated along the length of shaft 141 to further minimize rotational instability.

Elevation cam gear 136 is positioned coaxially around shaft 141, and may rotate independently of the shaft 141. Upper bearing 134 and lower bearing 138 provide for the rotational stability of elevation cam gear 136 as it rotates about shaft 141. Elevation cam 122 is attached to elevation cam gear 136 such that rotation of the elevation cam gear 136 results in corresponding rotation of the elevation cam 122.

Positioned within the mirror bracket 124, and secured in place with bracket pin 132, is stare mirror 126. As can be appreciated from FIG. 7, cam follower bracket 128 extends from the back side 129 of stare mirror 126, and is equipped with a cam follower 130. Cam follower 130 is designed to roll along the outer surface of elevation cam 122 and pivot cam follower bracket 128 and stare mirror 126 about bracket pin 132 in directions 131. Because the elevation cam may be rotated independently of azimuth shaft 141, the elevation of stare mirror 126 may be changed by rotating the elevation cam with respect to the azimuth shaft 141.

Due to the high rotational velocities of stare mirror 126, and the potential to nearly instantaneously reverse the direction of rotation, cam follower bracket 128 is preferably formed as an open frame; that is, with a hollow portion 146. The formation of hollow portion 146 greatly decreases the inertia of the rotation stare mirror 126 and cam follower bracket 128, thereby further improving the angular acceleration and deceleration rates of the rotating state mirror.

Figure 8:
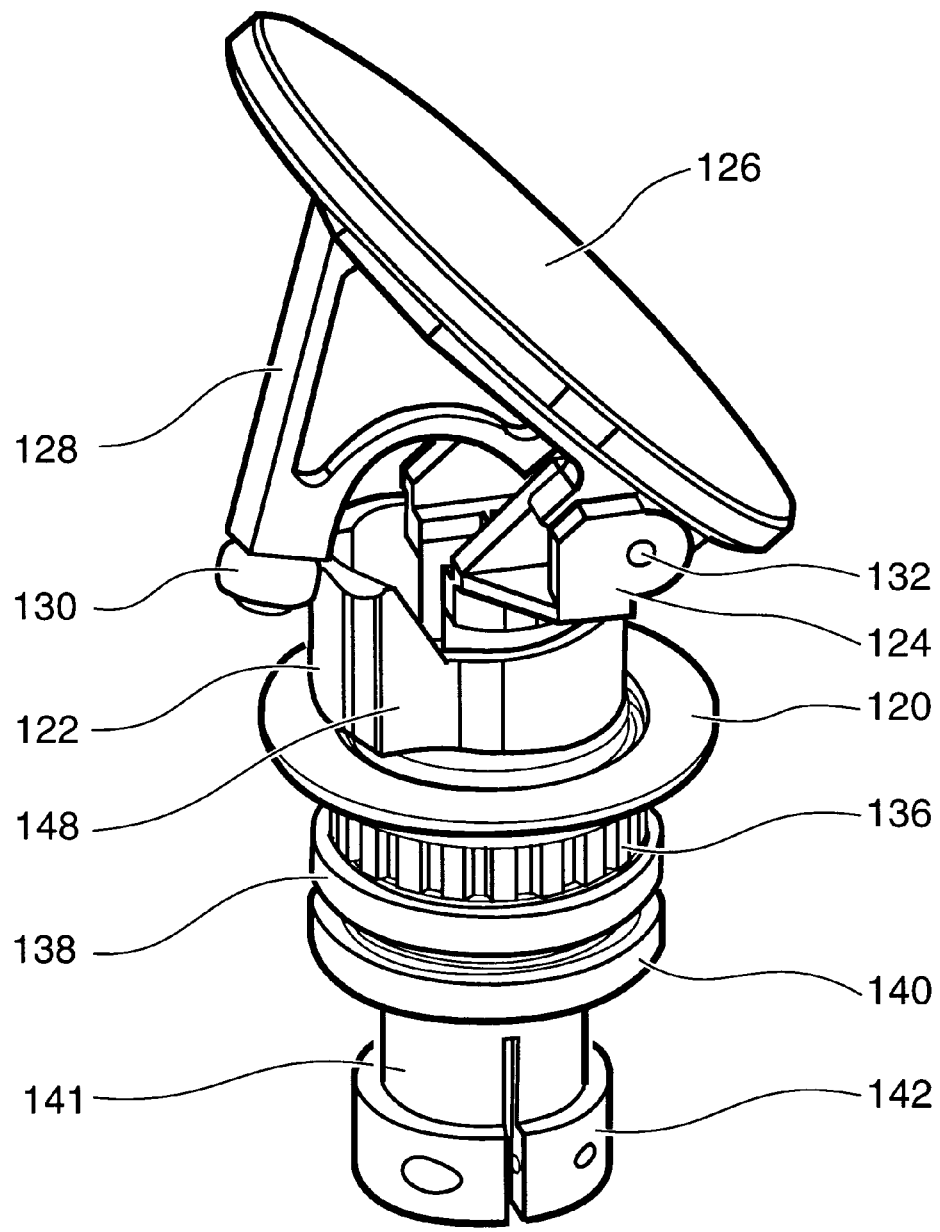
FIG. 8 is another perspective view of the alternative embodiment of the Projectile Tracking System of the present invention shown in FIGS. 6 and 7, and details the shape of the elevation cam.

Referring now to FIG. 8, an alternative perspective view of the Projectile Tracking System of the present invention is provided and shows the helical nature of elevation cam 122. More specifically, with reference to FIG. 9, elevation cam 122 is shaped to have a first radius 152 and a second radius 154, with a helical portion between the first and second radii. In a preferred embodiment, the first radius 152 is such that the elevation angle 131 is at a minimum, such as 0° above horizontal. Also, the second radius 154 may be such that the elevation angle 131 is at a maximum, such as 90° above horizontal.

Due to the angular change in radius of elevation cam 122, a transition slope 148 may be included to allow the cam to be rotated in both directions 172. The incorporation of the transition slope 148 is important as it enables bi-directional rotation, while at the same time ensuring that the cam follower 130 and stare mirror 126 will not be instantaneously stopped when attempting to rotate elevation cam 122 directly from low elevation position 153 to high elevation position 155.

Figure 9:
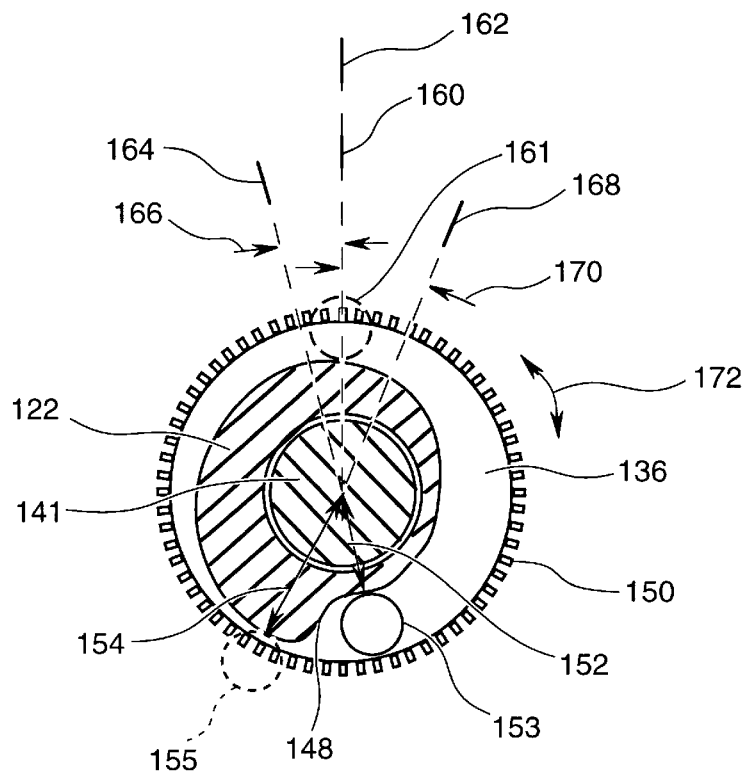
FIG. 9 is a cross-sectional view of the elevation cam taken along lines 9—9 of FIG. 7, showing the varying diameter of the elevation cam which, when rotated with respect to the azimuth drive motor, provides the elevation control of the stare mirror.
Figure 10:
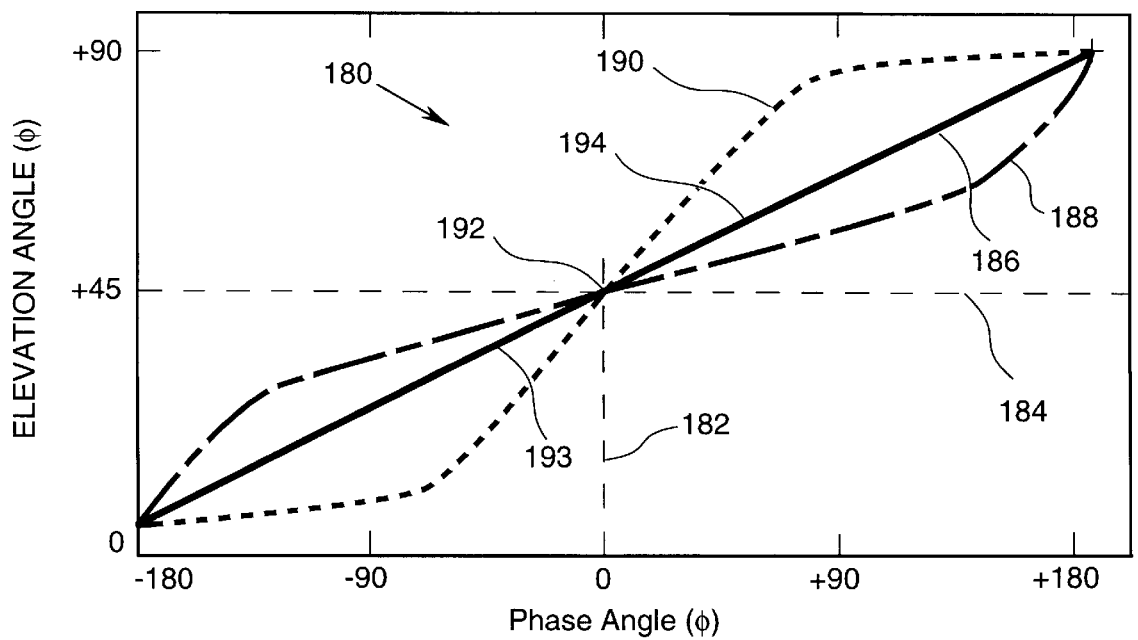
FIG. 10 is a graphical representation of the relationship between the elevation angle of the stare mirror and the rotational phase difference between the azimuth angle drive motor and the elevation angle drive motor.

The operation of the Projectile Tracking System may be fully appreciated by referring to FIGS. 9 and 10. As discussed above, in the illustrated embodiment, elevation cam 122 is driven by elevation drive motor 110 via belt 118, and belt 118 engages teeth 150 on elevation cam gear 136 such that the elevation cam gear 136 may be rotated about azimuth shaft 141. (Although a belt 118 has been discussed herein, it should be appreciated that elevation motor 110 may be directly coupled to or an integral part of elevation cam 122, thereby eliminating the need for the belt 118). With the azimuth shaft 141 in an initial rotation position 162, cam gear may be positioned at an initial rotational position 160 resulting in cam follower 130 being in position 161. In a preferred embodiment, position 161 may correspond to an elevation angle 131 of about 45°.

FIG. 10 shows a graphical representation of the relationship between the elevation angle 131 of the stare mirror 126, and the rotational phase difference between the azimuth angle drive motor 102 and the elevation angle drive motor 110. More specifically, graph 180 includes an X-coordinate axis for the elevation angle 131, and a Y-coordinate axis for the phase difference between the azimuth angle drive motor 102 and the elevation angle drive motor 110. In these initial rotational positions 160 and 162, the 45° elevation angle 131 of stare mirror 126 may be shown as point 192 on graph 180.

As elevation cam gear 136 is rotated from rotational position 160 to rotational position 164, the cam radius will increase, resulting in a decrease in elevation angle 131. Conversely, as elevation cam gear is rotated from rotational position 160 to rotational position 168, the cam radius will decrease, resulting in an increase of the elevation angle 131. Graphically, the change in rotational phase between position 160 and 164 would correspond to movement along curve 186 from point 192 to 193, and the change in rotational phase between position 160 and 168 would correspond to movement along curve 186 from point 192 to 194.

While it has been discussed that the phase change between the azimuth shaft 141 and the elevation cam 122 determines the elevation angle of the stare mirror 126, it should be appreciated that the azimuth drive rotates simultaneously, or independently of, the elevation cam 122. If both the azimuth drive 141 and the elevation cam 122 rotate in the same direction at the same rate, than the phase difference is unchanging, resulting in the side sweeping of the stare mirror at a constant elevation angle 131. On the other hand, if the elevation cam is rotated in the same direction, but at a slower rate, than the azimuth drive, the phase difference and corresponding elevation angle will change. In this manner, by rotating the azimuth drive and elevation cam independently, it is possible to point the stare mirror to any location in three-dimensional space nearly instantaneously.

Although elevation cam 122 is shown having a curvature which changes linearly from a small radius 152 to a large radius 154 as depicted by curve 186 on graph 180, it is possible to incorporate elevation cams having different shapes. For instance, curve 188 on graph 180 depicts an elevation cam having a linear portion with a lesser slope than curve 186 through most of the region between the −90° and +90° phase angles. This lesser sloped region would provide an elevation angle accuracy of more than the linearly changing elevation cam. This is particularly advantageous in situations where a greater level of elevation angle positional accuracy is required between approximately 30°–60°.

In situations where it is desirable to have a greater level of elevation angle positional accuracy, an elevation cam 122 having characteristics shown by curve 190 may be appropriate. More specifically, the elevation cam depicted by curve 190 would be formed with a rapid elevation angle transition between approximately 10°–80°, resulting in a greater level of elevation angle positional accuracy between 0°–10° and 80°–90°.

Although the preferred embodiment discussed in conjunction with FIGS. 6–10 exhibits a change of elevation angle from 0°–90°, it should be appreciated that the elevation angle of the stare mirror may exceed this range. More particularly, the shape and radius of the elevation cam may be modified to provide for an elevation angle ranging from about −20° to about 100°. This elevation range, combined with the rotation of the azimuth drive, will provide for a stare mirror range greater than hemispherical coverage.

While not critical, it is advantageous that the diameter of the elevation drive gear 116 and the elevation cam gear 122 be essentially exactly the same. This is so because the rotational accuracy of the motors is sufficient to position their respective rotational elements to within 1/200,000 of a revolution, or approximately 32 μradians. With this level of rotational accuracy, it is possible to position the elevation of the stare mirror to within about 0.00045° of a desired elevation angle 131.

High acceleration rates with relatively large apertures and large coverage areas were not available in other devices. The coaxial elevation cam 122 eliminates the need for a motor to be physically mounted along the elevation axis, and further lowers the inertia for elevation angle changes. More specifically, the present invention allows for near hemispheric coverage angles, with large apertures, at extremely high acceleration rates. By mounting both motors fixed relative to the azimuth axis, and by actuating the elevation axis via a cam co-axially mounted around the azimuth rotational element, the azimuth motor only has to deal with the azimuthal inertia of the mirror and mounting assembly. The elevation motor must deal only with the rotational inertia of the cam and the elevation inertia of the mirror and mount.

In order for the Projectile Tracking System of the present invention to properly track its target, it is desirable to minimize the wear and tear on the mechanical linkage components of the system which, over time, would create or compound positional inaccuracies. The elevation cam 122 and cam follower 130 of the present invention minimizes any build-up of inaccuracies by determining the elevation angle using only the rotation of the elevation cam. While there may be some wear of the cam follower 130, such wear will be minimal, and may be further minimized by using a bearing (not shown) within the cam follower, and by pre-charging this bearing to avoid physical changes in the bearing.

A Fourth Preferred Embodiment

Figure 11:
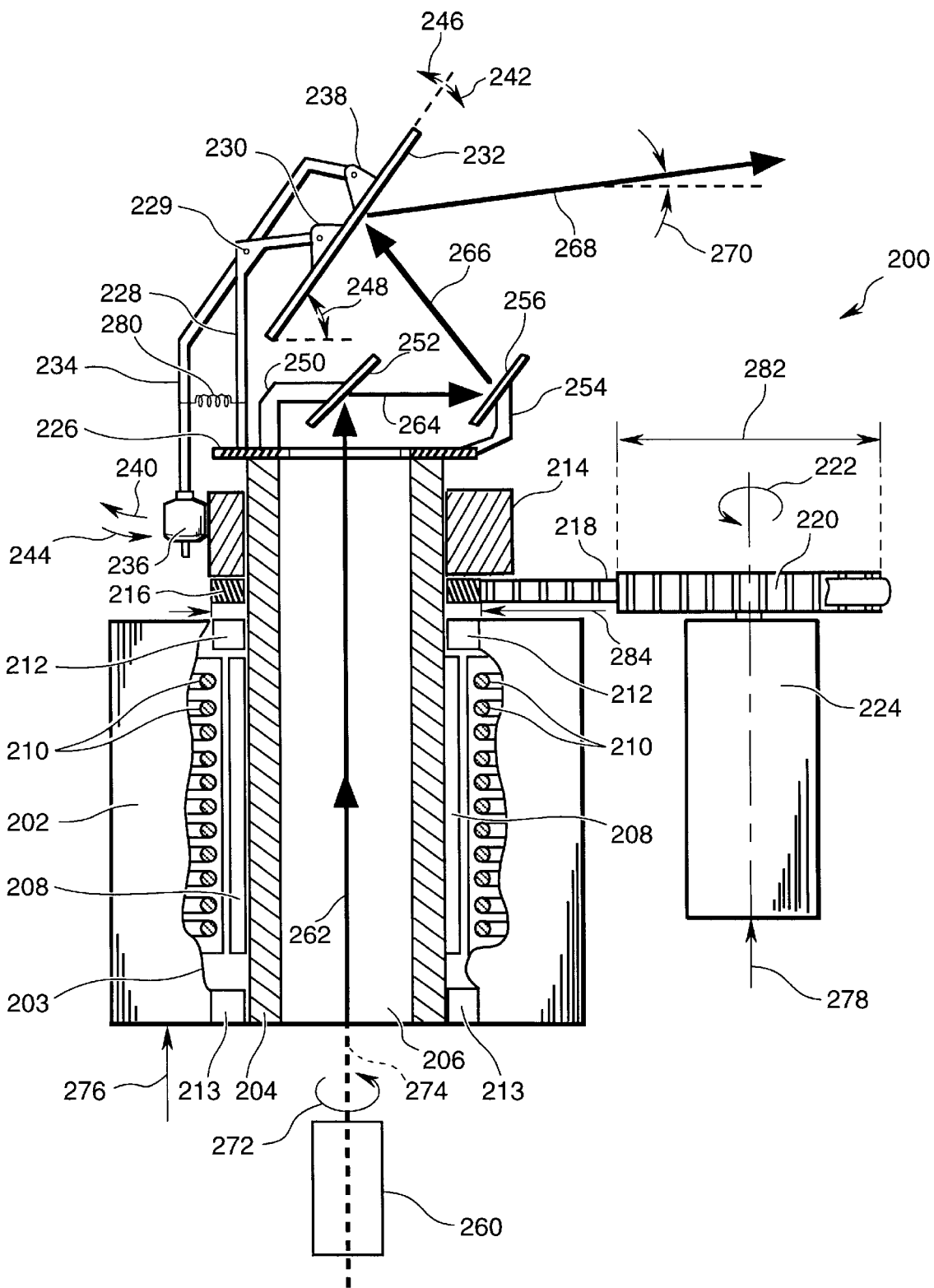
FIG. 11 is a side view of an alternative embodiment of the Projectile Tracking System of the present invention with portions shown in cross-section and with portions removed for clarity, and having an azimuth drive motor with a hollow shaft that allows for the mounting of the laser source directly beneath the drive motor assembly, and having a number of deflecting mirrors for directing the laser to the stare mirror.

FIG. 11 shows an alternative embodiment of the Projectile Tracking System of the present invention, generally designated 200. Projectile Tracking System 200 includes an azimuth drive motor 202, shown with portions 203 removed for clarity. The azimuth rotational element 204 of motor 202 is formed with a bore 206, and is equipped with permanent magnets 208 positioned for reacting with electrical windings 210 to rotate the rotational element. Shaft 204 is supported within motor 202 by upper shaft bearings 212 and lower shaft bearings 213.

Elevation cam 214 is positioned around azimuth drive rotational element 204 and is attached to elevation cam gear 216. Like the preferred embodiments discussed above, the elevation cam gear 216 and elevation cam 214 may be rotated independently of rotational element 204. Drive belt 218 extends between elevation cam gear 216 and elevation drive gear 220, such that rotation of elevation drive gear 220 is rotated in direction 222 by elevation drive motor 224, elevation cam 214 is also rotated.

Mounted to the upper end of azimuth rotational element 204 is base plate 226 from which extends a stare mirror support 228, having a pivot 229, and attaching to pivot bracket 230 of stare mirror 232. Cam follower lever 234 pivots through pivot 229 and connects to stare mirror 232 via cam follower linkage 238. Cam follower 236 is attached to the end of the cam follower lever 234, and rolls along the outside of elevation cam 214 as it is rotated. More specifically, when elevation cam 214 is rotated and pushes cam follower 236 in direction 240, cam follower lever 234 pivots about pivot 229 to cause stare mirror 232 to pivot in direction 242 changing elevation angle 248. Similarly, when elevation cam 214 is rotated and pushes cam follower 236 in direction 244, cam follower lever 234 pivots about pivot 229 to cause stare mirror 232 to pivot in direction 246.

Extending from base plate 226 is an arm 250 supporting first deflecting mirror 252 over bore 206. Also, arm 254 extends from base plate 226 to support a second deflecting mirror 256. A particular advantage of this preferred embodiment is that Projectile Tracking System 200 may rotate through a full azimuth rotation without moving its laser source or sensor. More specifically, a laser 260 may be positioned within, or just outside, bore 206 and directed along optical beam path 262. First deflecting mirror 252 re-directs beam 262 to beam 264 which is in turn re-directed to beam 266 by second deflecting mirror 256. Beam 266 strikes stare mirror 232 to be re-directed to beam 268 at an elevation angle 270, which is determined by elevation cam 214. In this manner, beam 268 may be directed anywhere in at least a hemispherical range, by modification of elevation angle 270 and rotation of azimuth rotational element 204 in direction 272.

Laser source 260 may be positioned away from motor 202, so long as the laser beam is re-directed to optical axis 274. Also, electrical control of azimuth drive motor 202 and elevation drive motor 224 are controlled via electrical inputs 276 and 278, respectively. Such motor control would be generated, for example, by the supervisor computer 34 shown in FIG. 1.

In order to facilitate the rapid azimuthal rotation of stare mirror 232, it is advantageous to provide a spring 280 which urges cam follower 236 against the elevation cam 214. Such urging would resist the centrifugal tendency of cam follower 236 to move in direction 240 as the azimuth rotational element 204 rotates in direction 272.

The diameter 282 of elevation drive gear 220 may be the same as the diameter 284 of elevation cam gear 216. In such a situation, the rotation of the elevation cam gear 216 will correspond to the elevation drive motor 224. This provides for a high degree of rotational accuracy, as well as the ability to track the elevation angle 248 of the stare mirror 232. It should be appreciated, however, that the diameters 282 and 284 may differ. In circumstances where a degree of accuracy greater than 1/200,000 is needed, it would be possible to incorporate an elevation cam gear 216 having a greater diameter 284. On the other hand, where a high degree of accuracy is not needed, it would be possible to incorporate an elevation cam gear 216 having a smaller diameter.

While Projectile Tracking System 200 has been discussed in conjunction with a laser source 260, it is to be appreciated that a sensor may be used instead. For instance, an infrared or other light sensor may be used, with the stare mirror collecting these light signals and redirecting them to deflection mirrors 256 and 252 for viewing along the optical axis 274. Also, a series of lenses may be incorporated into the Projectile Tracking System 200 to further refine the light signals re-directed by stare mirror 232.

While the above descriptions contain many specificity's, the reader should not construe these as limitations on the scope of this invention, but merely as exemplifications of preferred embodiments thereof. Those skilled in the art will envision many other possible variations which are within its scope. Accordingly, the reader is requested to determine the scope of the invention by the appended claims and their legal equivalents and not by the examples which have been given.

What is claimed is:

1. A system for tracking a projectile, comprising:
   a steerable optical system including:
      an azimuth drive motor having a rotational element defining an axis of rotation;
      a step and stare mirror mounted to the rotational element of the azimuth drive motor along the axis of rotation, and pivotable to define an elevation angle;
      an elevation cam mounted coaxially about the axis of rotation;
      an elevation drive motor coupled to the elevation cam to rotate the elevation cam about the axis of rotation;
      a cam follower extending from the step and stare mirror and in contact with the elevation cam wherein rotation of the elevation cam results in a corresponding change in elevation angle;
   an optoelectronic system, coupled to the steerable optical system, for detecting a projectile through the steerable optical system, steering the steerable optical system to track the detected projectile, and generating range and position for the detected projectile; and
   an analysis system, coupled to the steerable optical system and the optoelectronic system, for determining the trajectory of the detected projectile based upon range and position data generated by the optoelectronic system.

2. The system of claim 1, wherein the rotational element of the azimuth drive motor is formed with a longitudinal bore for passing light through the rotational element to the step and stare mirror.

3. The system of claim 2, further comprising a first and second deflecting mirror, wherein the light passed through the rotational element is redirected by the first deflecting mirror and the second deflecting mirror to the step and stare mirror.

4. A steerable optical system comprising:
   an azimuth drive motor having a rotational element defining an axis of rotation;
   a step and stare mirror mounted to the rotational element of the azimuth drive motor along the axis of rotation, and pivotable to define an elevation angle;
   an elevation cam mounted coaxially about the axis of rotation;
   an elevation drive motor coupled to the elevation cam to rotate the elevation cam about the axis of rotation;
   a cam follower extending from the step and stare mirror and in contact with the elevation cam wherein rotation of the elevation cam results in a corresponding change in elevation angle;
   an elevation drive gear mounted to the elevation drive motor; and
   an elevation drive belt extending between the elevation drive gear and the elevation cam wherein rotation of the elevation drive gear results in rotation of the elevation cam.

5. The system of claim 4, further comprising an elevation cam gear attached to the elevation cam, wherein the elevation drive belt extends between the elevation drive gear and the elevation cam gear wherein rotation of the elevation drive gear results in rotation of the elevation cam gear and elevation cam.

6. A steerable optical system comprising:
   an azimuth drive motor having a rotational element defining an axis of rotation;
   a step and stare mirror mounted to the rotational element of the azimuth drive motor along the axis of rotation, and pivotable to define an elevation angle;
   an elevation cam mounted coaxially about the axis of rotation;
   an elevation drive motor coupled to the elevation cam to rotate the elevation cam about the axis of rotation;
   a cam follower extending from the step and stare mirror and in contact with the elevation cam wherein rotation of the elevation cam results in a corresponding change in elevation angle; and
   wherein the rotational element of the azimuth drive motor is formed with a longitudinal bore for passing light through the rotational element to the step and stare mirror.

7. A steerable optical system comprising:
   a step and stare mirror rotatable azimuthally about an axis of rotation, and pivotable to define an elevation angle;
   an elevation cam mounted coaxially about the axis of rotation;
   an elevation drive motor coupled to the elevation cam to rotate the elevation cam about the axis of rotation;
   a cam follower extending from the step and stare mirror and in contact with the elevation cam wherein rotation of the elevation cam results in a corresponding change in elevation angle;
   an azimuth drive motor coupled to the step and stare mirror for rotating the step and stare mirror in an azimuth direction;
   an azimuth drive gear coupled to the azimuth drive motor; and
   an azimuth drive belt extending between the azimuth drive gear and the step and stare mirror wherein rotation of the azimuth drive motor causes a corresponding rotation of the step and stare mirror.

8. The system of claim 7, further comprising an azimuth mirror gear wherein the rotation of the azimuth motor causes a corresponding rotation of the step and stare mirror.

* * * * *